(12) United States Patent
Nakamura

(10) Patent No.: US 6,407,829 B1
(45) Date of Patent: Jun. 18, 2002

(54) IMAGE READING APPARATUS

(75) Inventor: Hiroaki Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/237,793

(22) Filed: Jan. 27, 1999

(30) Foreign Application Priority Data

Jan. 27, 1998 (JP) ............................................. 10-013853

(51) Int. Cl.[7] .................................................. H04N 1/04
(52) U.S. Cl. ....................... 358/494; 250/559.4; 382/299
(58) Field of Search ................................... 358/494, 482, 358/483, 474, 489, 1.9, 1.2, 527; 250/559.4, 208.6; 382/299, 319

(56) References Cited

U.S. PATENT DOCUMENTS 5,889,596 A * 3/1999 Yaguchi ...................... 358/448
5,963,344 A * 10/1999 Morita ........................ 358/482
6,188,807 B1 * 2/2001 Kabushiki .................... 382/319
2001/0055105 A1 * 12/2001 Katakura ...................... 355/53

FOREIGN PATENT DOCUMENTS

JP 411215328 * 8/1999 ............ H04N/1/19

* cited by examiner

Primary Examiner—Jerome Grant, II
Assistant Examiner—Negussie Worku

(57) ABSTRACT

There is provided an image reading apparatus wherein prior to fine scan of an original image using a line CCD sensor at high resolution, a single prescan at low resolution is performed on the scanning lines of the original image using at least two different storage times of the line CCD sensor, in order to determine the reading conditions for the fine scan at the high resolution and the conditions for correction the fine scanned image date. Irrespective of the density of a particular frame image, a single prescan suffices for detecting maximum and minimum densities as well as high-density and medium-to low density image data of appropriate precision in an appropriate and positive way. Then, image information for acquiring not only optimal reading conditions for fine scan that are associated with the density and other characteristics of the original image, but also the conditions as for correcting the captured image data processing conditions can be obtained.

22 Claims, 9 Drawing Sheets

FIG. 2
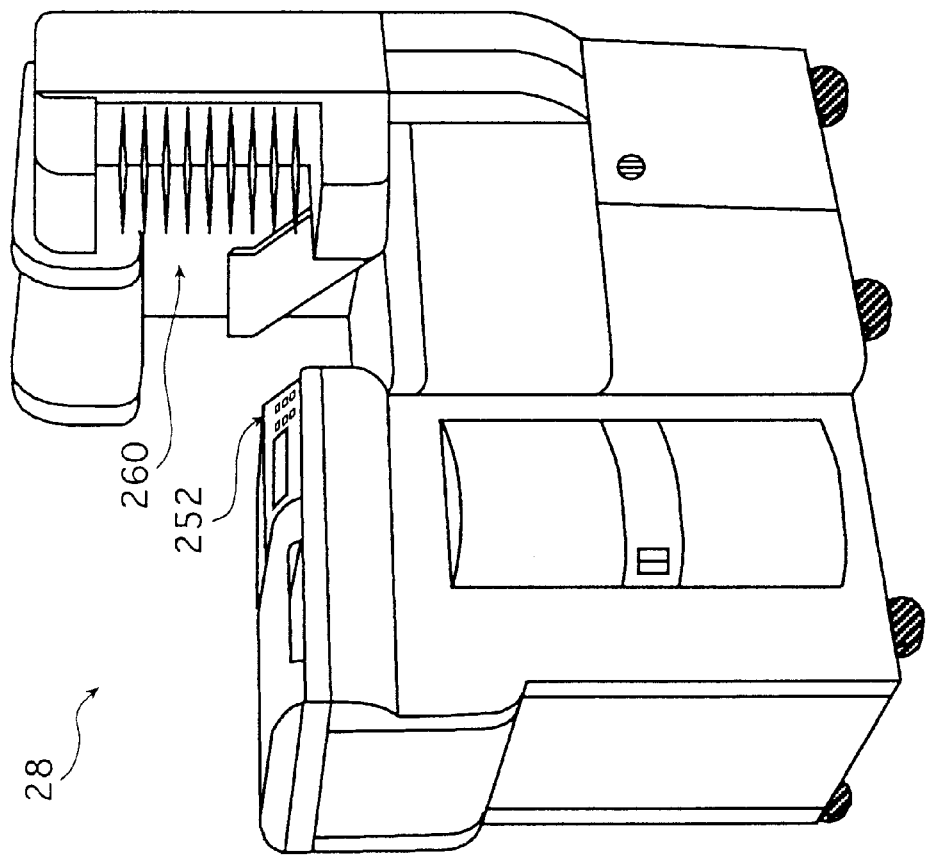
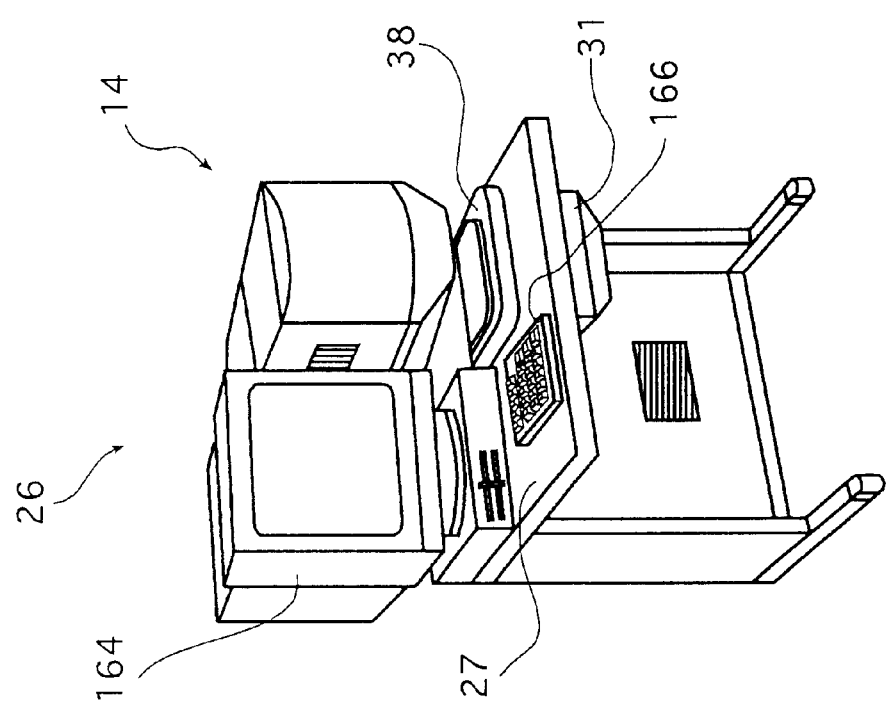

IMAGE READING APPARATUS

BACKGROUND OF INVENTION

This invention relates to an image reading apparatus that reads original images photoelectrically using a line CCD sensor. More particularly, the invention relates to an image reading apparatus that performs prescan of the images to calculate the image correcting conditions for fine scan of the images.

There has been known an image processing system in which the image recorded on a photographic film is read with an image reading apparatus having a reading sensor such as a CCD sensor. The resulting image data is subjected to correcting and various other image processing steps and recording of the image on a recording material, representation of the image on a display and other operations are subsequently performed. Film images (particularly negative images recorded on negative films) have great variations in density. Thus, in order to obtain image records or displays of the desired quality, the conventional image reading apparatus performs prescan (preliminary reading of the film image) to determine the reading conditions associated with the density and other factors of the film image (as exemplified by the quantity of light incident on the film image and the charge storage time of CCD) and then performs fine scan (reads the film image under the thus determined reading conditions).

When the color gradation of an original image is to be adjusted on the basis of the maximum density (Dmax) and minimum density (Dmin) of each color component that are determined from the prescanned image, the maximum density (Dmax) generally requires reading with a very high precision. However, image reading for prescan is difficult to achieve in a manner that is associated with the varying density ranges of the original image and, hence, the quantity of light and the storage time of a CCD sensor are often set as fixed conditions that are referenced to the base density of the original image (on a negative or reversal film). In this case, due to the limited dynamic range of the CCD sensor, the image that is read from the maximum density (Dmax) side of a high-density film is deteriorated in S/N ratio. Therefore, if a high-density film is to be read with an existing image reading apparatus that uses an area CCD sensor, precise reading of the maximum density (Dmax) must be ensured by performing a second prescan with the storage time varied from the first prescan.

However, due to the high cost of area CCD sensors, the conventional image reading apparatus depends on a single area CCD sensor for reading the three primary color components of one film image and this requires three prescans to be performed using a different color filter for each color component. In other words, in order to read a high-density film with the conventional image reading apparatus, three prescans must be performed with varying storage times and this has been painstaking and cumbersome operation.

Film with use of a lens is gaining wide acceptance because it is simple to use. However, images recorded by films with lens and other cameras that do not have a diaphragm have a tendency to become overexposed to produce "over negatives". In order to read a film containing many over negatives, the number of prescan cycles is further increased to require more painstaking and cumbersome operations.

Under the circumstances, it has been proposed to use an inexpensive line CCD sensor comprising three line CCD elements that are individually equipped with filters for three primary color components. With such a line CCD sensor, the film images in a plurality of frames are transported for scanning to achieve simultaneous reading of the three primary color components in a continuous way, thereby reducing the cost of the image reading apparatus while realizing faster image reading. However, in order to perform repeated prescans for reading a high-density film in the manner described above, the line CCD sensor requires the film to be transported again for a second prescan and the problem of the painstaking and cumbersome operation becomes more serious than in the case of the area CCD sensor.

SUMMARY OF INVENTION

An object, therefore, of the present invention is to provide an image reading apparatus that uses an inexpensive line CCD sensor and which yet performs preliminary reading of an original image by a single prescan with the line CCD sensor that is set to an optimal storage time in accordance with the density of the original image. In this arrangement, optimal reading conditions for fine scan that are associated with the density and other factors of the original image (exemplified by the quantity of light incident on the film image and the charge storage time of the CCD sensor), and conditions for correcting the fine scanned image data and other processing conditions can be determined in an appropriate manner.

To attain the stated object, the present invention provides an image reading apparatus in which the image carried on an original undergoing relative movement is read by photoelectric with a line CCD sensor having a single array of CCD elements in a direction perpendicular to the relative movement of the original image, characterized in that prior to the fine scan of said original image by means of said line CCD sensor at high resolution, a single prescan at low resolution is performed on the scanning lines of the original image using at least two kinds of storage times of said line CCD sensor, in order to determine the reading conditions for the fine scan at the high resolution and the conditions for correcting the fine scanned image data.

In a preferred embodiment, the storage time of the line CCD sensor can be varied between odd-numbered scanning lines and even-numbered scanning lines.

The number of scanning lines for prescan using at least two kinds of storage times can be made different with each storage time.

If desired, the two kinds of storage times may comprise a standard storage time and a high-density image bearing original compatible storage time.

Further, at least one kind of image data, that was read by prescan using the two kinds of storage times, may be used for display on a monitor.

Further, and desired, at least one kind of image data that was read by prescan using the two kinds of storage times may be used for setup calculations.

BRIEF DESCRIPTION OF DRAWINGS

FIG. 2 is an exterior view of the digital lab system shown in FIG. 1;

DETAILED DESCRIPTION OF THE INVENTION

Figure 1:
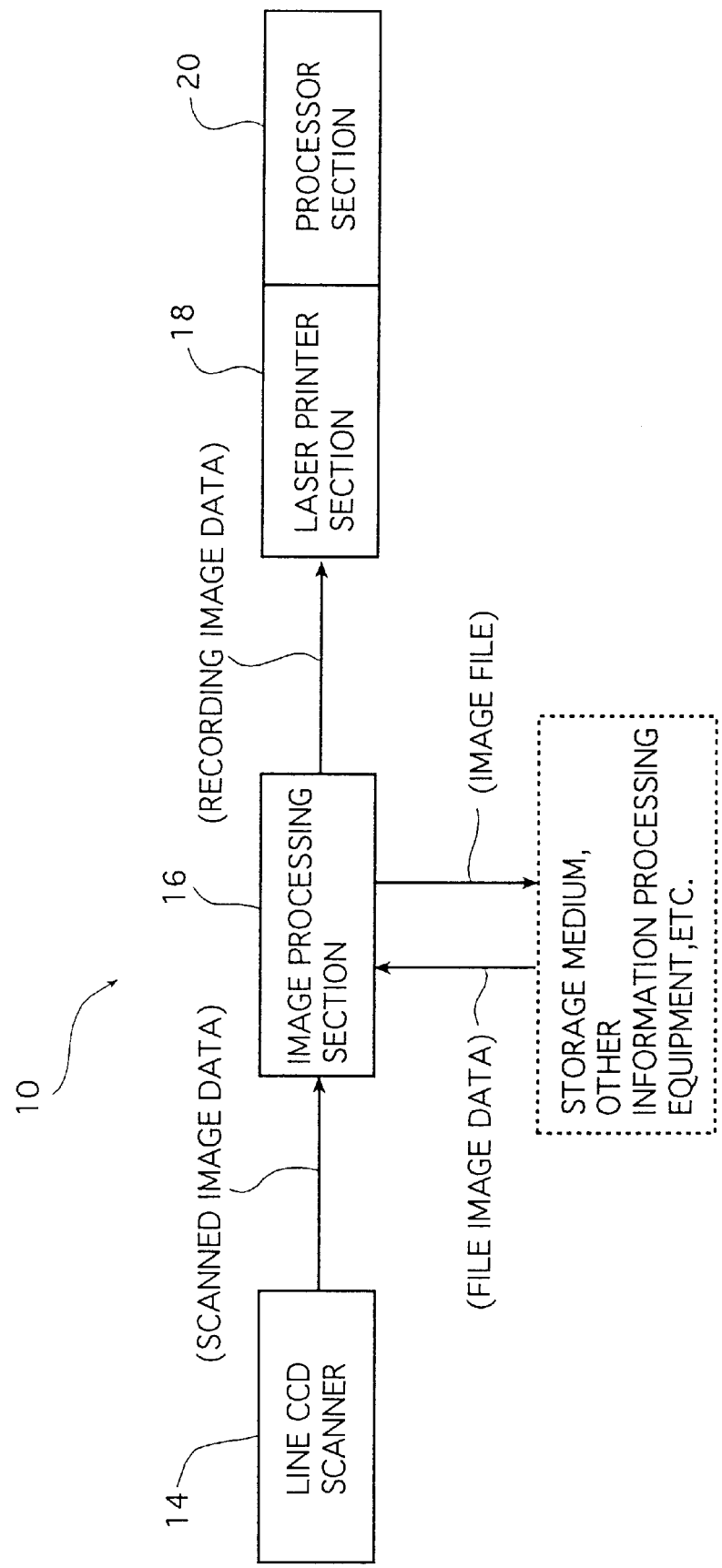
FIG. 1 is a schematic diagram of a digital lab system to which an embodiment of the image reading apparatus of the invention is applied.

An embodiment of the present invention is hereunder described in detail with reference to the accompanying drawings. The following description starts with the explanation of the digital lab system of the embodiment. General Layout of the System FIG. 1 shows the general layout of the digital lab system 10 of the embodiment and FIG. 2 shows the exterior of the same system. As shown in FIG. 1, the lab system 10 comprises a line CCD scanner 14, an image processing section 16, a laser printer section 18 and a processor section 20. The line CCD scanner 14 and the image processing section 16 are integrated into an input unit 26 as shown in FIG. 2, and the laser printer section 18 and the processor section 20 are integrated into an output unit 28 as also shown in FIG. 2.

The line CCD scanner 14 is for reading the images recorded on a photographic film such as a negative or reversal film. Examples of photographic films bearing the images to be read include a photographic film of 135 size, a photographic film of 110 size, as well as a photographic film having a clear magnetic layer (i.e., one of 240 size which is commonly called "APS film"), and photographic films of 120 and 220 sizes (Brownie films). The line CCD scanner 14 performs photoelectric reading of the images on one of those films with a line CCD sensor (which is hereinafter referred to simply as "line CCD") and outputs the resulting image data.

The image processing section 16 receives the image data (scanned image data) that is outputted from the line CCD scanner 14; it is also adapted to be such that the image data obtained by recording with a digital camera, the image data obtained by scanner reading of originals other than the film image (e.g. a reflection original), computer generated image data and other image data (which are hereinafter referred to collectively as "file image data") can be supplied from an external circuit (such as via a storage medium (i.e., memory card) or supplied from other information processing equipment through a communication line).

The image processing section 16 performs various corrections and other image processing steps on the received image data and outputs it to the laser printer section 18 as recording image data. The image processing section 16 is also adapted to be such that the thus processed image data can be outputted to an external circuit as an image file (as to a storage medium such as a memory card or transmitted to other information processing equipment through a communication line).

Figure 3A:
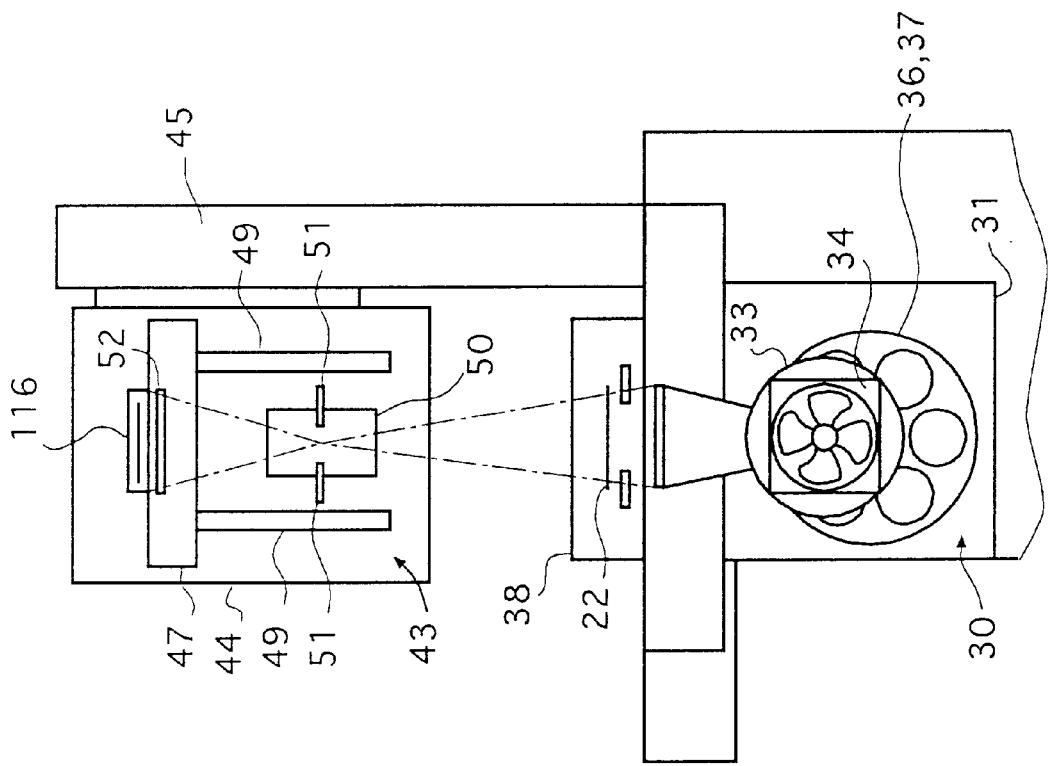
FIGS. 3A and 3B show schematically an example of the general layout of the optics of the invention's image reading apparatus that is applied to the digital lab system shown in FIG. 2.
Figure 3B:
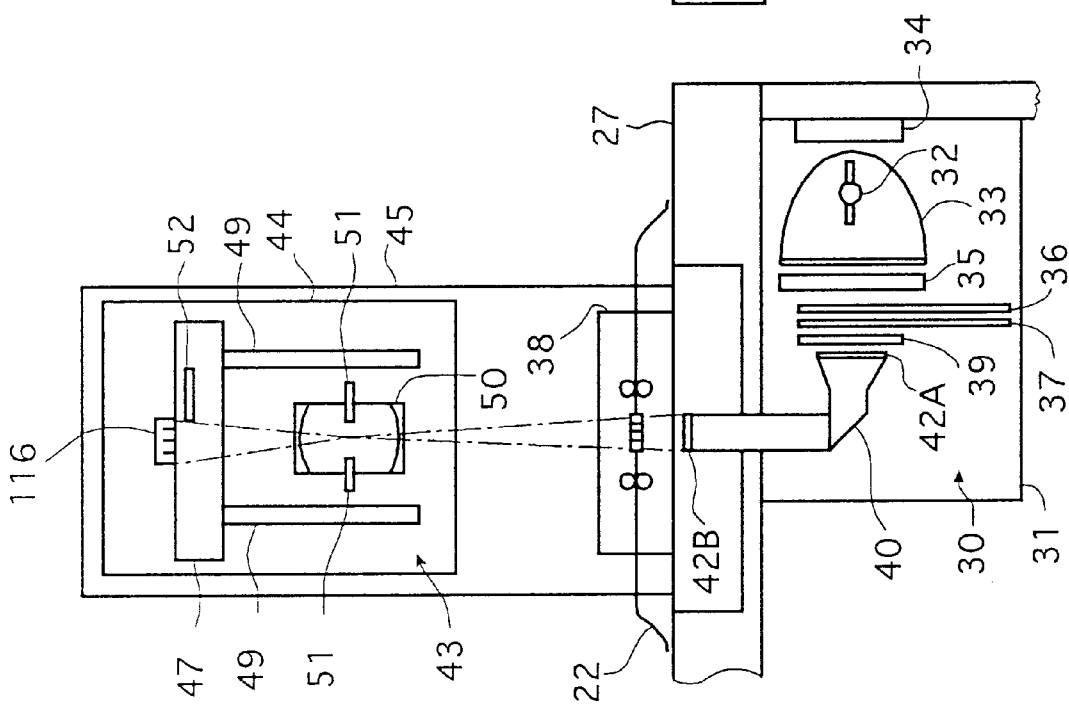

The laser printer section 18 has R, G and B laser light sources and illuminates photographic paper with laser beams modulated in accordance with the recording image data supplied from the image processing section 16 and scan exposure is performed to record an image on the photographic paper. The processor section 20 performs color development, bleach fixing, rinsing and drying on the photographic paper on which the image has been recorded by scan exposure in the laser printer section 18. As a result, a final image is formed on the photographic paper. Layout of the Line CCD Scanner We next describe the layout of the line CCD scanner 14 as the image reading apparatus of the present invention. FIGS. 3A and 3B show the general layout of the optics of the line CCD scanner 14, within FIGS. 4A–4C each illustrate an exemplary turret, diaphragm and lens diaphragm used in the image reading apparatus of the invention. The line CCD scanner 14 has a light source section 30 provided below a worktable 27 on which the input unit 26 rests. The light source section 30 is contained in a metallic casing 31 and a lamp 32 typically in the form of a halogen lamp or a metal halide lamp is located in the right-hand portion of the casing 31 (see FIG. 3A).

The lamp 32 is partly surrounded by a reflector 33 which reflects a portion of the light from the lamp 32 to be launched in a specified direction (to the left of FIG. 3A). A fan 34 is provided on the side of the reflector 33 which is remote from the light emerging side. The fan 34 is actuated as long as the lamp 32 is on, thereby ensuring that the interior of the casing 31 is not overheated. On the light emerging side of the reflector 33, there are provided an UV/IR cutting filter 35 (ultraviolet and infrared radiation blocking means), turrets 36 and 37, a diaphragm 39 and a light diffusing box 40 in that order along the optical axis of the light emerging from the reflector 33. The filter 35 cuts the light in the uv and ir wavelength ranges, thereby preventing the temperature elevation of a photographic film 22 and improving the reading precision.

Figure 4A:
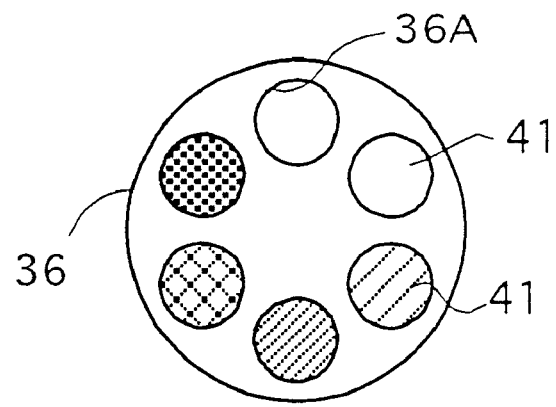
FIG. 4A is a plan view of an exemplary turret used in the image reading apparatus shown in FIG. 3.

As also shown in FIG. 4A, a plurality of holes 36A are pierced in the turret 36 and all holes 36A except one are fitted with dimmer filters 41 that attenuate a certain of light components R, G and B and which have different attenuations for the light of a certain color component (which is hereinafter referred to as "first color component"). The turret 37 has generally the same structure as the turret 36 except that all holes except one are fitted with dimmer filters that attenuate the light of a different color component than the dimmer filters 41 (which is hereinafter referred to as "second color component"). Both turrets 36 and 37 are so arranged that either one of the holes is always located on the optical axis and that upon rotation, different holes are sequentially positioned on the optical axis.

Figure 4B:
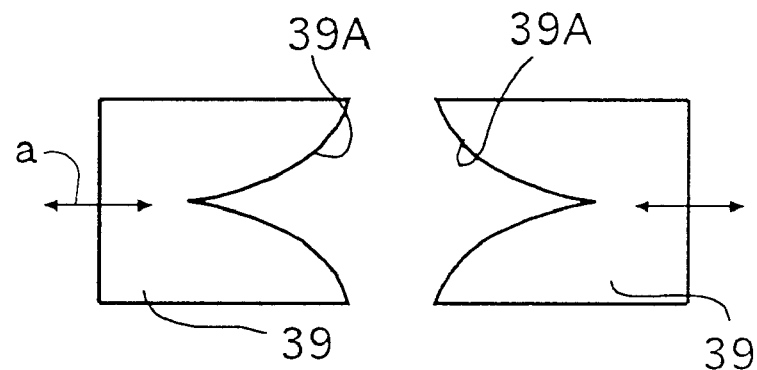
FIG. 4B is a plan view of an exemplary diaphragm used in the same image reading apparatus.

The diaphragm 39 is made up of a pair of plate members positioned on opposite sides of the optical axis such that they can slide toward or away from each other. As shown in FIG. 4B, each of the plate members forming the diaphragm 39 has a cutout 39A formed on one side such that a cross-sectional area as measured in a direction perpendicular to the sliding direction varies continuously from one end to the other in the sliding direction and that the sides with cutouts 39A face each other.

In the construction described above, the proportion between the light of the first color component and the light of other color component varies depending upon which one of the holes in the turret 36 is positioned on the, optical axis, and the proportion between the light of the second color component and the light of other color component varies depending upon which one of the holes in the turret 37 is positioned on the optical axis, and the quantity of light passing through the diaphragm 39 varies depending upon its position (i.e., the area of the gap between the two plate members) Hence, the quantity of light of each color component that is launched through the turrets 36 and 37 and through the diaphragm 39 can be adjusted by these means uniformly without causing any spatial unevenness in color.

The light diffusing box 40 is generally L-shaped with the middle portion being bent at right angles. Inside the bent portion is provided a total reflection mirror with which the light launched into the diffusing box 40 is deflected by 90° before it exits from the box. The light-emerging end of the diffusing box 40 has an elongated rectangular shape with the longer side being along the width of the photographic film 22, or in a direction perpendicular to its transport by a film carrier 38 that is set on the worktable 27 (see FIGS. 3A and 3B). At the same time, the dimension of the light diffusing box 40 as measured along the width of the photographic film 22 increases progressively from the bent portion toward the light emerging end. The light diffusing box 40 is equipped with light diffusing plates 42A and 42B at the entrance and exit ends, respectively.

Having the construction just described above, the light diffusing box 40 causes the optical path of the incident light to be bent 90° toward the film carrier 38 (hence, the photographic film 22), producing a beam of slit light that is elongated along the width of the photographic film 22 and which emerges as light that has been diffused by means of the diffusing plates 42A and 42B. Since the light exiting from the light diffusing box 40 is diffused light, the unevenness in the quantity of light falling on the photographic film 22 is sufficiently reduced to ensure that the film image is illuminated with a uniform quantity of the slit light and, at the same time, any flaw on the film image becomes less noticeable.

If desired, the light diffusing box 40 may be so shaped that its dimension as measured along the width of the photographic film 22 decreases progressively from the bent portion toward the light emerging end.

A reader 43 contained in a casing 44 is provided on the side of the worktable 27 which is remote from the light source section 30. A support frame 45 is erected on the worktable 27 and the casing 44 is supported on the frame 45 in such a way that it is slidable either toward or away from the table 27. A bench 47 is provided within the casing 44 and a plurality of support rails 49 are suspended from the bench 47. A lens unit 50 is supported on the rails 49 in such a way that it is slidable either toward or away from the table 27.

Figure 4C:
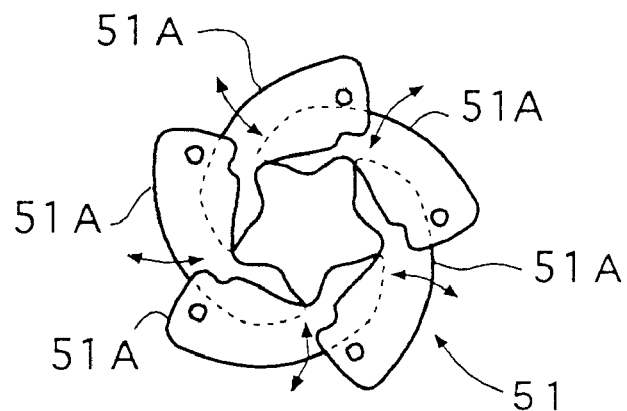
FIG. 4C is a plan view of an exemplary lens diaphragm used in the same image reading apparatus.

The lens unit 50 consists of at least two lens elements, between which a lens diaphragm 51 is provided. As shown in FIG. 4C, the lens diaphragm 51 which is generally called an iris diaphragm consists of more than one stop plate 51A generally shaped like the letter C. Individual stop plates 51A are provided equidistantly around the optical axis and each stop plate is axially supported on a pin at one end so that it is pivotal around the pin. The individual stop plates 51A are coupled together by means of links (not shown) such that they pivot in the same direction upon receiving the driving force of a lens diaphragm drive motor (to be discussed later).

As the diaphragm plates 51A pivot, the area of the generally star-shaped portion shown In FIG. 4C (which is unblocked by the plates 51A) varies with the center being located on the optical axis and, as a result, the quantity of light passing through the lens diaphragm 51 also varies.

A line CCD 116 is mounted on top of the bench 47. It is generally known as a 3-line color CCD sensor, in which three sensing portions each comprising a single array of many photoelectric transducers (CCD elements) such as CCD cells and photodiodes and also being provided with an electronic shutter mechanism are provided parallel to each other at given spacings. The entrance ends of the three sensing portions are fitted with R, G and B color separating filters, respectively. Provided near and in correspondence to each sensing portion is a transfer portion comprising a number of CCD cells so that the electric charges stored in the CCD cells of each sensing portion are successively transferred via the associated transfer portion.

Thus, the line CCD 116 is a line sensor (more specifically a 3-line color CCD sensor) A 3-line color CCD sensor has no need of using a color separating prism and this feature, coupled with he ease of installation, contributes to reduce the cost of the line CCD scanner 14.

A CCD shutter 52 for dark correction of the line CCD 116 is provided on its entrance side. The CCD shutter 52 is fitted with a ND filter (not shown) to enable selection between the following three states: TOTAL CLOSE in which the light coming to the line CCD 116 is totally blocked; TOTAL OPEN in which the incoming light is admitted into the line CCD 116; and ATTENUATION in which the light coming to the line CCD 116 is attenuated by the ND filter.

It should be noted that in the present invention, so-called "storage time", or the time for storing electric charge in CCD cells, is variable either for every line or for more than one line. The storage time may be set to vary continuously so that the dynamic range of each CCD element can be set to fall within any part of the whole density range of the original film image; however, this requires a cumbersome setting procedure and a complex control process, thereby increasing the complexity and price of the control hardware and software items. Because of these difficulties, it is recommended to set at least two kinds of storage time in consideration of the predictable deviation of the film image's density. Preferably, the two storage times may be a storage time that is referenced to the base density of a film and which enables the reading of many or almost all film images, and a high-density compatible storage time that can handle over negatives. If necessary, a low-density storage time that can handle under negatives, as well as one or more kinds of storage times in between the above-mentioned three storage times may also be added.

Figure 5:
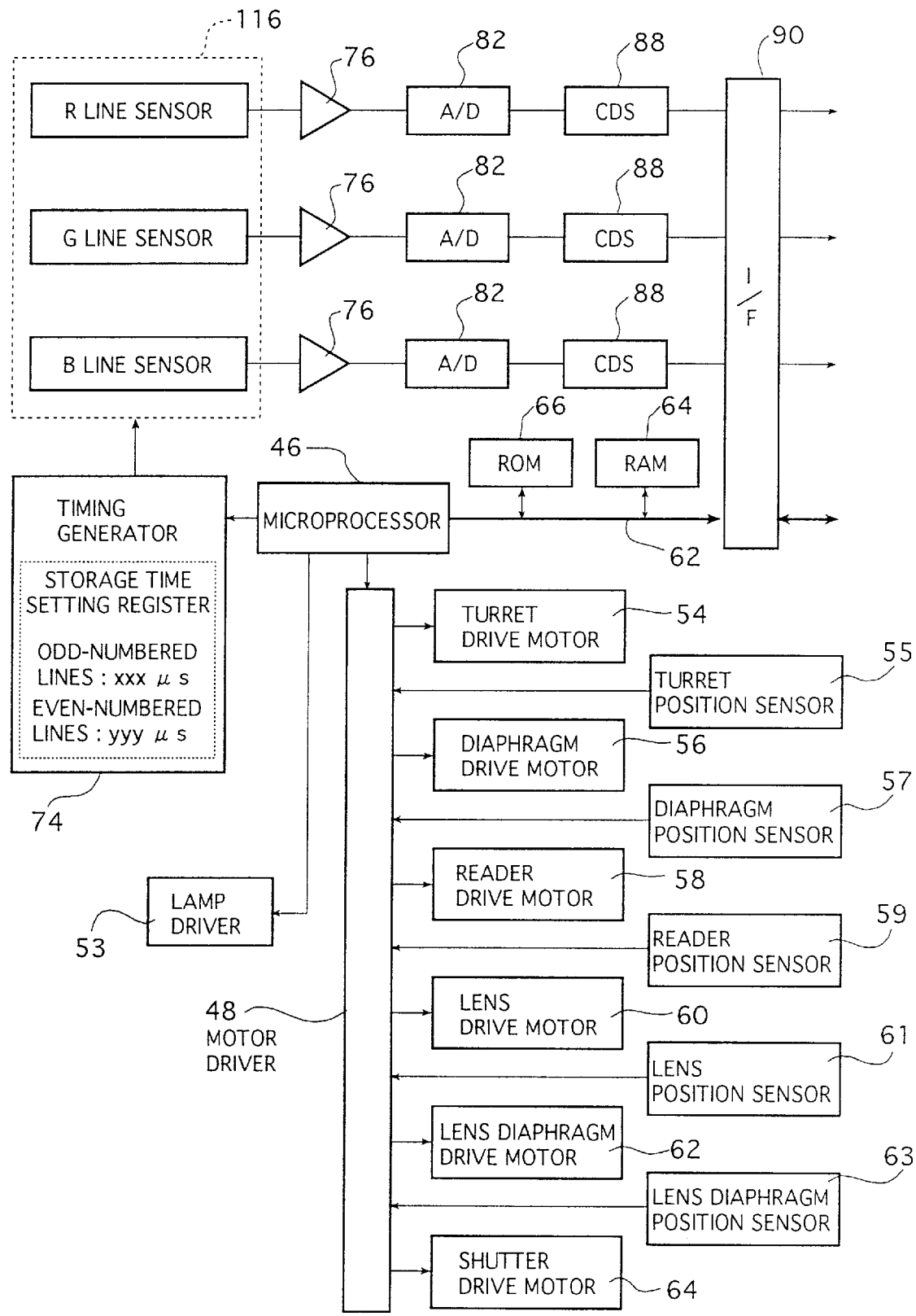
FIG. 5 is a block diagram showing the general layout of an example of the electronic circuit of the image reading apparatus shown in FIG. 3.

FIG. 5 shows the general layout of the electronic circuit of the line CCD scanner 14. The line CCD scanner 14 has a microprocessor 46 that controls its overall operation. The microprocessor 46 is connected to a RAM 64 (e.g. SRAM) and a ROM 66 (e.g. ROM, EPROM and EEPROM of which the memory contents are rewritable) via a bus 62; it is also connected to a lamp driver 53 and a motor driver 48. The lamp driver 53 turns the lamp 32 on or off in response to a command from the microprocessor 46.

The motor driver 48 is connected to the following components: a turret drive motor 54 for driving the turrets 36 and 37 to rotate independently of each other in such a way that any one of the holes in the turrets 36 and 37 is positioned on the optical axis; a turret position sensor 55 for detecting the positions (angles of rotation) of the turrets 36 and 37; a diaphragm drive motor 56 for causing the diaphragm 39 to slide; a diaphragm position sensor 57 for detecting the position of the diaphragm 39; a reader drive motor 58 with which the casing 44 containing the reader 43 is allowed to slide along the support frame 45; a reader position sensor 59 for detecting the position of the casing 44 (hence, the reader 43); a lens drive motor 60 for causing the lens unit 50 to slide along the support rails 49; a lens position sensor 61 for detecting the position of the lens unit 50; a lens diaphragm drive motor 62 for pivoting the stop plates 51A of the lens diaphragm 51; a lens diaphragm position sensor 63 for detecting the position of the lens diaphragm 51. (namely, the positions of the stop plates 51A); and a shutter drive motor 64 for switching the CCD shutter 52 to either one of the three states, TOTAL CLOSE, TOTAL OPEN and ATTENUATION.

When the film image is read by the line CCD 116 (when it performs photometry), the microprocessor 46 drives the turrets 36 and 37 to rotate by means of the turret drive motor 54 on the basis of the positions of the turrets 36 and 37 (as detected by the turret position sensor 55) and the position of the diaphragm 39 (as detected by the diaphragm position sensor 57); at the same time, the microprocessor 46 causes the diaphragm 39 to slide by means of the diaphragm drive motor 56, whereby the quantity of light incident on the film image is adjusted for each color component.

The microprocessor 46 also determines the zoom ratio in accordance with the size of the film image or depending on whether trimming is to be done and in order to ensure that the film image is read by the line CCD 116 at the thus determined zoom ratio, the microprocessor 46 causes the casing 44 to slide by means of the reader drive motor 58 on the basis of the position of the casing 44 as detected by the reader position sensor 59 and it also causes the lens unit 50 to slide by means of the lens drive motor 60 on the basis of the position of the lens unit 50 as detected by the lens position sensor 61.

When focus control (auto focus control) is to be performed to bring the light-receiving plane of the line CCD 116 into agreement with the position where the film image is focused by the lens unit 50, the microprocessor 46 causes only the casing 44 to slide by means of the reader drive motor 58. An exemplary method of this focus control is by ensuring that the film image as read by the line CCD 16 has a maximum contrast (this is the so-called "image contrast method"). Alternatively, a range sensor that measures the distance between the photographic film and the lens unit 50 (or line CCD 116) with an ir radiation or by some other means is provided so that the intended focus control Is achieved not on the basis of the film image data but on the basis of the distance detected by the range sensor.

A liming generator 74 is connected to the line CCD 116 to generate various timing signals (clock signals) for operating the line CCD 116, A/D converters 82 to be described later, and other associated components. The timing generator 74 contains a storage time setting register to set storage times for scanning in odd- and even-numbered lines. On the basis of the thus set values, the timing signals cause the line CCD 116 to read images with different values of storage time depending upon whether the scan line is odd- or even-numbered. The signal output terminals of the line CCD 116 are connected to the A/D converters 82 via amplifiers 76 so that the output signals from the line CCD 116 are amplified with the amplifiers 76 and then converted to digital data by means of the A/D converters 82.

The output terminals of the A/D converters 82 are connected to an interface (I/F) circuit 90 via correlated double sampling (CDS) circuits 88. The CDS circuits 88 sample both feed-through data that represents the level of a feed-through signal and pixel data that represents the level of a pixel signal and subtracts the feed-through data from the pixel data for each image. The results of the calculation (pixel data that are correctly associated with the stored charges in the CCD cells) are successively outputted as scanned image data into the image processing section 16 via the I/F circuit 90.

Since R,G,B photometric signals are outputted in parallel from the line CCD 116, the number of signal processing lines that each comprise amplifier 76, A/D converter 82 and CDS circuit 88 is correspondingly three and R,G,B image data are outputted in parallel as scanned image data.

Layout of the Image Processing Section

Figure 6:
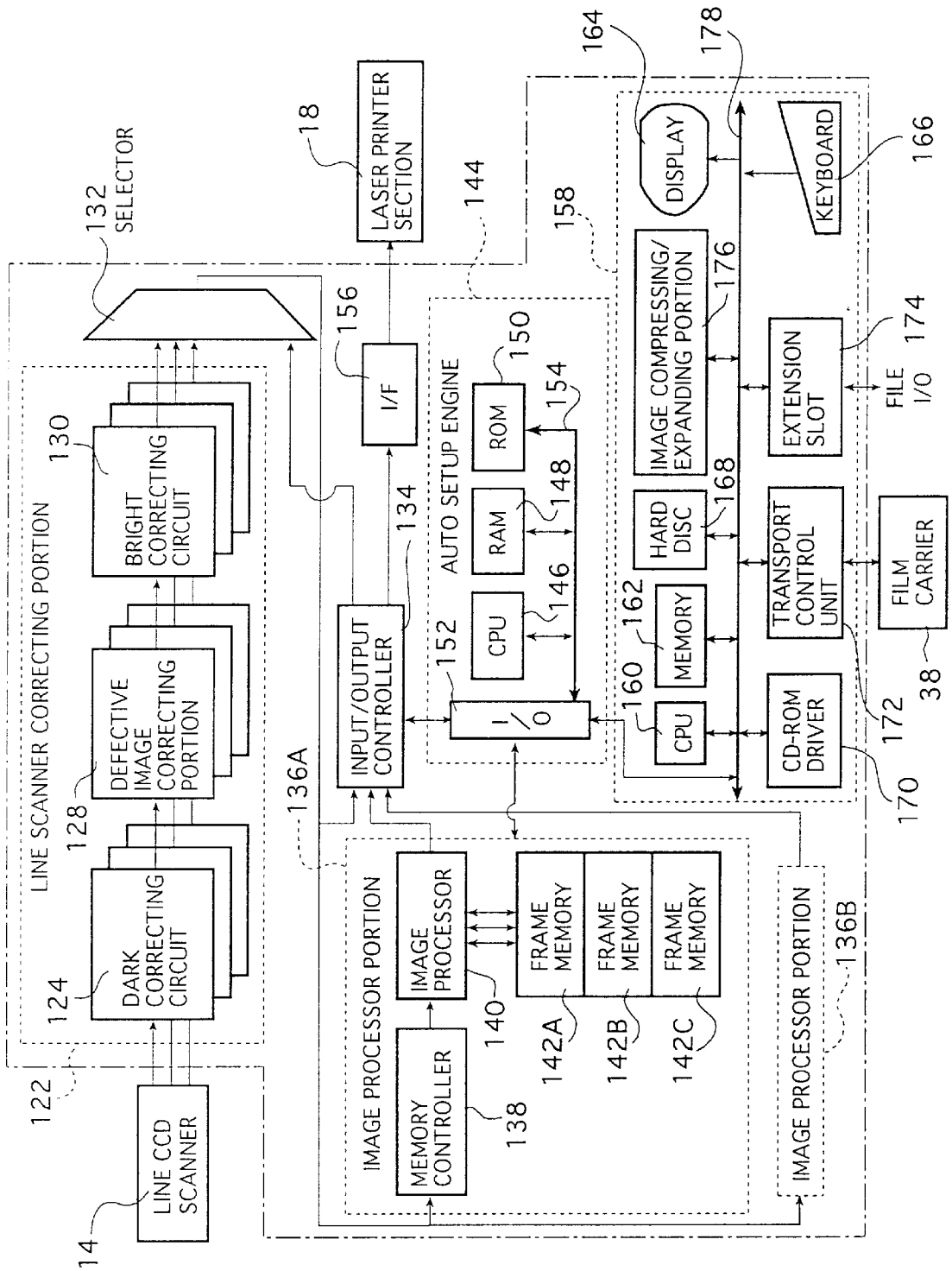
FIG. 6 is a block diagram showing the general layout of an example of the image processing section of the digital lab system shown in FIG. 2.

We now describe the layout of the image processing section 16 with reference to FIG. 6. The image processing section 16 has a line scanner correcting portion 122 in association with the line CCD scanner 14. In association with the R,G,B image data being outputted in parallel from the line CCD scanner 14, the line scanner correcting portion 122 has three signal processing lines each comprising a dark correcting circuit 124, a defective pixel correcting portion 128 and a bright correcting circuit 130.

In the dark correcting circuit 124, data supplied from the line CCD scanner 14 with the entrance side blocked by the CCD shutter 52 (the data representing the dark output levels of the CCD cells in each sensing portion of the line CCD 116) are stored for each cell and correction is made by subtracting the dark output level for each pixel from the image data that was supplied from the line CCD scanner 14 by its reading of the photographic film 22.

The photoelectric conversion characteristics of the line CCD 116 also vary from one cell to another. In the bright correcting circuit 130 subsequent to the defective image correcting portion 128, a gain is determined for each cell on the basis of the image data for an adjusting film image having a constant density throughout the picture that has been supplied from the line CCD 116 by its reading of the adjusting film image which is set on the line CCD scanner 14 (the variation in density for each pixel that is represented by said image data is due to the variation in the photoelectric conversion characteristics of each cell) and the image data for the original film image as supplied from the line CCD scanner 14 is corrected for each pixel in accordance with the cell-dependent gain.

If, in the image data for the adjusting film image, a specified pixel has a much different density than other pixels, the cell in the line COD 116 that is associated with the specified pixel has something abnormal and one may well conclude that the specified pixel is defective. The defective image correcting portion 128 stores the address of the defective pixel on the basis of the image data for the adjusting film image and as regards the defective pixel in the image data for the original film image that was supplied from the line CCD scanner 14, it generates new data by interpolating the data for the surrounding pixels. It should be mentioned here that since the line CCD uses fewer CCD cells than the area CCD, the defective pixel. correcting portion 128,needs only a simple construction.

It should also be noted that since the line CCD 116 consists of three lines (CCD cell arrays) that are spaced apart in the direction of transport of the photographic film 22, the image data for the R,G,B color components start to be outputted from the line CCD scanner 14 at different times. The line scanner correcting portion 122 delays the outputting of image data by different time durations for respective color components so that R,G,B data for the same pixel on the film image will be outputted simultaneously.

The output terminals of the line scanner correcting portion 122 are connected to the input terminals of a selector 132 and the data outputted from the correcting portion 122 after being converted to density data by log transformation are supplied to the selector 132. Another input terminal of the selector 132 is connected to the data output terminal of an input/output controller 134, which supplies the selector 132 with external film image data. The output terminal of the selector 132 is connected to the data input terminals of the input/output controller 134 and image processor portions 136A and 136B. The selector 132 is so adapted that it is capable of selectively outputting the entered image data to the input/output controller 134 and image processor portions 136A and 136B.

The image processor portion 136A has a memory controller 138, an image processor 140, and three frame memories 142A, 142B and 142C. Frame memories 142A, 142B and 142C each have a sufficient capacity to store the image data for one frame of film image and the image data supplied from the selector 132 is stored in either one of the three frame memories 142. The memory controller 138 then controls the addressing for the storage of image data in a selected frame memory 142 such that the data for the pixels in the entered image data are stored in a specified order in the storage area of the selected frame memory 142.

The image processor 140 captures the image data stored in the frame memory 142 and performs various image processing steps such as Gradation transformation, color transformation, hypertoning for compressing the gradation of the ultralow-frequency luminance component of the image, and hypersharpening for enhancing sharpness while suppressing graininess. The conditions for the above-mentioned image processing steps are calculated automatically with an auto setup engine 144 (to be described later) and image processing is performed under the calculated conditions. The image processor 14 is connected to the input/output controller 134 and the image data subjected to various image processing steps is stored in the frame memory 142 before it is outputted to the input/output controller 134 at a specified timing. The image processor portion 136B has the same construction as the above-described image processor portion 136A and, hence, need not be described in detail.

In the embodiment under discussion, the line CCD scanner 14 reads an individual film image twice at different resolutions. In the first, preliminary reading at a comparatively low resolution (which is hereinafter referred to as "prescan"), the storage time of the line CCD line 116 is varied for at least two scan lines. For example, storage time is varied to at least two kinds for at least one scan line. Speaking of the prescan to be performed in the present invention, image reading is done with the storage time varied two ways, one for scanning in odd-numbered lines and the other in even-numbered lines. For scanning in odd-numbered lines, the film image (photographic film 22) is read either with a low-density compatible storage time that is so determined as to ensure that no saturation of stored charges occurs in the line CCD 116 even if the film image has an extremely low density (as exemplified by an under-exposed image on a negative film) or with a storage time that is so determined as to ensure precise production of the maximum density (Dmax) and the minimum density (Dmin) of film images without causing saturation of stored charges in the line CCD 116 for almost all films (typically a negative film image under standard exposure) as referenced to the base density of the film (said storage time is hereinafter referred to as "standard storage time"). For scanning in even-numbered lines, the film images are read with a storage time that is so determined as to enable precise detection of the maximum density (Dmax) even in the case of the frame images on a film having a high overall density (said storage time is hereinafter referred to as "high-density compatible storage time"). The data obtained by this prescan step (i.e., prescanned data) is supplied from the selector 132 into the input/output controller 134, from which it is transferred to the subsequent auto setup engine 144.

The auto setup engine 144 has a CPU 146, a RAM 148 (e.g. DRAM), a ROM (e.g. ROM of which the storage contents can be altered) and an input/output port 152; these components are interconnected via a bus 154.

The auto setup engine 144 evaluates the film image on the basis of the prescanned data supplied from the input/output controller 134 and extracts the data in the region associated with the film image (said data being, "prescanned image data"). On the basis of the prescanned image data, the auto setup engine 144 determines the type of the film image (as differentiated by size, density, etc.) and outputs the information about frame position and type to the line CCD scanner 14. In addition, on the basis of the prescanned image data for more than one frame of film images, the auto setup engine 144 calculates the conditions for the image processing steps to be performed on the image data obtained by the second reading with the line CCD scanner 14 at a comparatively high resolution (which is hereinafter referred to as "fine scan") and outputs the calculated processing conditions to the image processor 140 in the image processor portion 136.

When calculating the conditions for image processing steps, the auto setup engine 144 checks for the presence of at least two film images recording similar scenes on the basis of the amount of exposure applied in picture taking, the type of the light source used and other characteristic quantities. If at least two film images are found to have recorded similar scenes, the auto setup engine 144 determines the conditions for the image processing to be performed on the fine scanned image data for these film images in such a way that they are either identical or similar to each other.

It should be noted here that optimal image processing conditions also vary depending upon whether the as-processed image data is to be used for image recording on photographic paper in the laser printer section 18 or to be outputted to an external circuit. The image processing section 16 has two image processor portions 136A and 136B, so if the image data is to be used for image recording on photographic paper and also to be outputted externally, the auto setup engine 144 shall calculate optimal processing conditions for the respective purposes and output them to the image processor portions 136A and 136B. As a result, the image processor portions 136A and 136B perform image processing on the same fine scanned image data under different conditions.

On the basis of the prescanned image data for the film image that has been supplied from the input/output controller 134, the auto setup engine 144 also calculates image recording parameters that specify gray balance and other factors to be required when recording an image on photographic paper in the laser printer section 18 and outputs them to the laser printer section 18 simultaneously with recording image data (to be described below). The auto setup engine 144 follows the same procedure in calculating the conditions for the image processing steps to be performed on file image data supplied from an external circuit.

The input/output controller 134 is connected to the laser printer section 18 via an I/F circuit 156. If the as-processed image data is to be used for image recording on photographic paper, the image data that has been subjected to various image processing steps in the image processor portion 136 is supplied from the input/output controller 134 through the I/F circuit 156 to go to the laser printer section 18 as recording image data. The auto setup engine 144 is also connected to a personal computer 158. If the as-processed image data is to be outputted externally as an image file, the image data that has been subjected to various image processing steps in the image processor portion 136 is supplied from the input/output controller 134 through the auto setup engine 144 to go to personal computer 158.

The personal computer 158 has a CPU 160, a memory 162, a display 164 and keyboard 166 (also see FIG. 2), a hard disk 168, a CD-ROM driver 170, a transport control unit 172, an extension slot 174 and an image compressing/expanding unit 176; these components are interconnected via a bus 178. The transport control unit 172 is connected to the film carrier 38 and controls the transport of the photographic film 22 on the carrier 38. If an APS film is set on the film carrier 38, the information it reads from the magnetic layer in the APS film (as exemplified by print size) is supplied to the transport control unit 172.

A driver (not shown) that reads data from and writes it to a storage medium such as a memory card or a communication control device for performing communication with some other information processing equipment is connected to the personal computer 158 via the extension slot 174. If the personal computer 158 receives image data from the input/output controller 134 for external outputting, the image data is outputted as an image file to the external circuit (e.g. the driver or communication control device) via the extension slot 174. If file image data is externally supplied to the personal computer 158 via the extension slot 174, the entered file image data is outputted to the input/output controller 134 via the auto setup engine 144. The input/output controller 134 then outputs the file image data to the selector 132.

Image processing section 16 is designed to be such that when outputting the prescanned image data, etc., to the personal computer 158 and representing on the display either the film image read with the line CCD scanner 14 or the result of estimation of the image to be recorded on photographic paper, it can modify the image processing conditions in accordance with an operator command such as one for image retouching that is entered from the keyboard 166.

Layouts of the Laser Printer and Processor Sections

Figure 7:
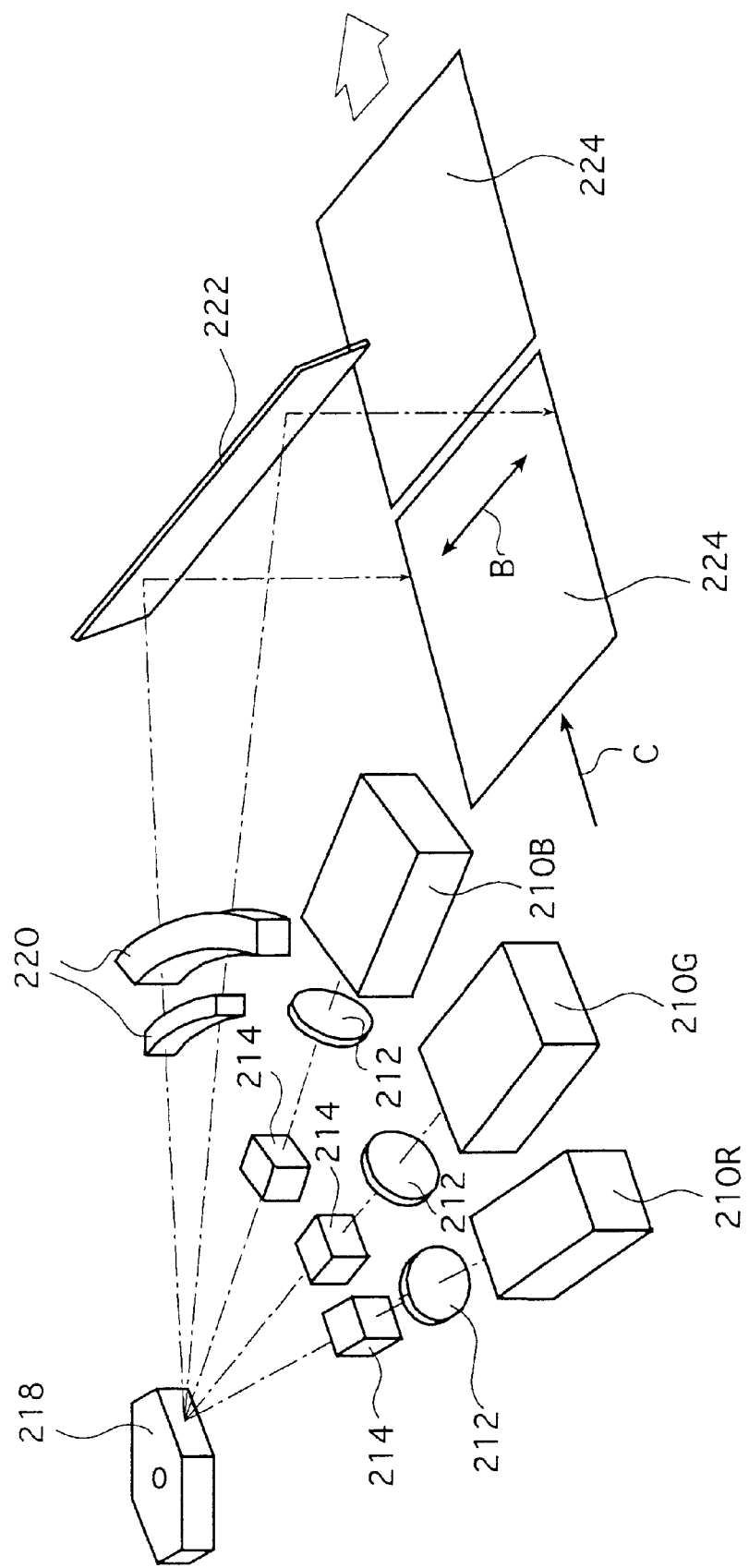
FIG. 7 shows schematically an example of the optics of the laser printer section of the digital lab system shown in FIG. 2.

We next describe the layouts of the laser printer section 18 and the processor section 20. FIG. 7 shows the layout of the optics in the laser printer section 18 which has three laser light sources 210R, 210G and 210B. Laser light source 210R consists of a semiconductor laser (LD) emitting laser light at the wavelength of R. Laser light source 210G consists of a LD and a second harmonic generator (SHG) with which the laser light emitted from the LD is halved in wavelength. The emission wavelength of the LD is so specified that the SHG emits laser light at the wavelength of G. Similarly, laser light source 210B consists of LD and SHG, with the emission wavelength of the LD being so specified that the SHG emits laser light at the wavelength of B.

A collimator lens 212 and an acousto-optical modulator (AOM) 214 are provided in that order on the side of each laser light source (210R, 210G, 210B) from which laser light is emitted. AOM 214 is provided in such a way that the incident laser light will pass through the acousto-optical medium and it is also connected to an AOM driver 216 (see FIG. 8). If a high-frequency signal is supplied from the AOM driver 216, an ultrasonic wave created by that signal propagates through the acousto-optical medium and the laser light passing through the medium undergoes an acousto-optical effect, whereupon diffraction occurs and laser light of an intensity proportional to the amplitude of the high-frequency signal is emitted as diffracted light from AOM 214.

A polygonal mirror 218 is provided on the side of AOM 214 from which the diffracted light is emitted. Three laser light beams at the wavelengths of R, G and B which are emitted as diffracted light from the respective AOMs 214 are incident at substantially the same position on a reflecting surface of the polygonal mirror 218 and reflected therefrom. On the side of the polygonal mirror 218 from which the laser light exits, fθ lenses 220 and a plane mirror 222 are provided so that the three laser beams reflected from the polygonal mirror 218 pass through the fθ lenses 220 and are reflected by the plane mirror 222 to illuminate photographic paper 224.

Figure 8:
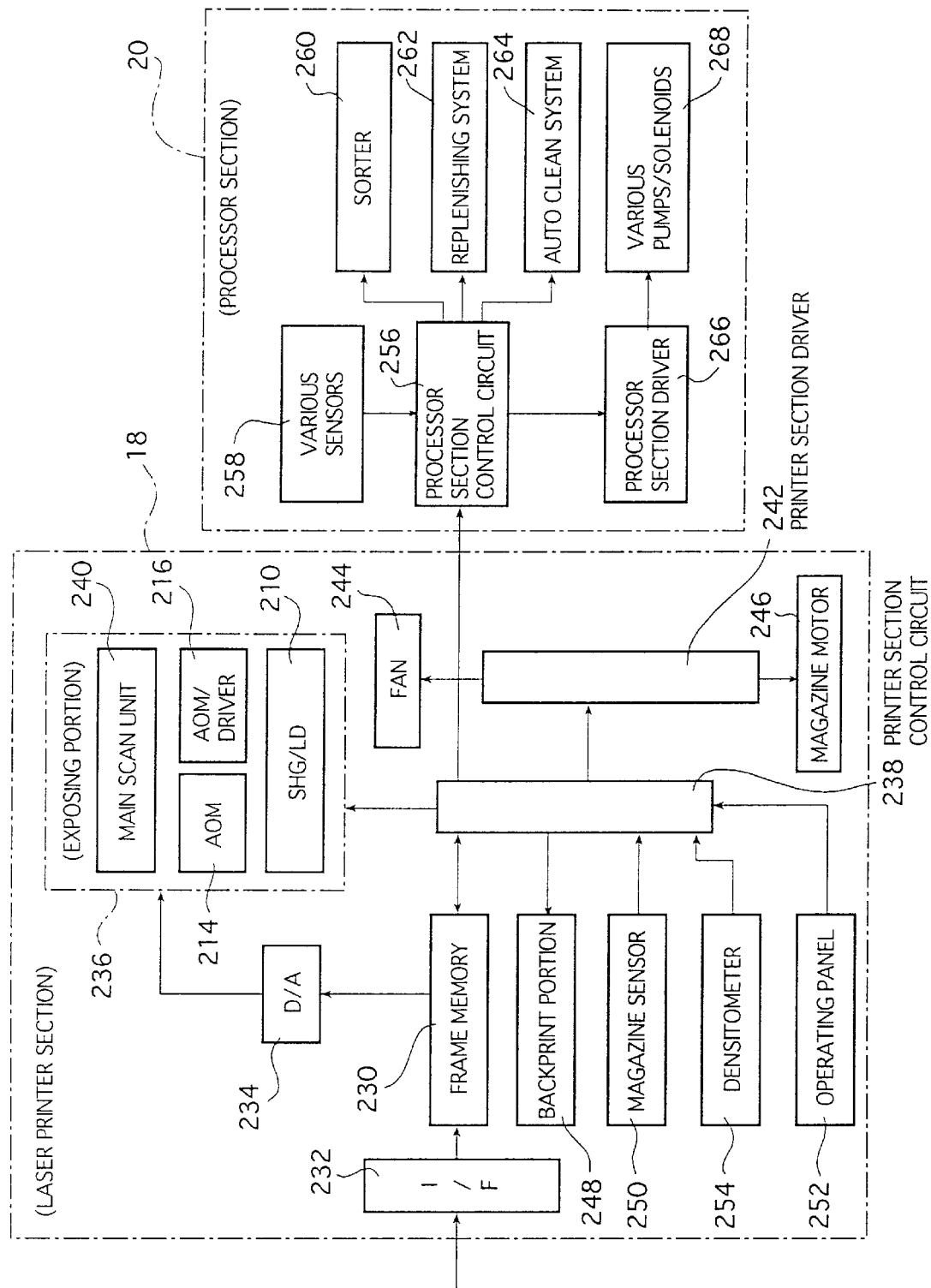
FIG. 8 is a block diagram showing the general layout of an example of the electronic.circuit of the laser printer section and the processor section of the digital lab system shown in FIG. 2.

FIG. 8 shows the general layouts of the electronic circuits in the laser printer section 18 and the processor section 20. The laser printer section 18 has a frame memory 230 for storing image data. The frame memory 230 is connected to the image processing section 16 via an I/F circuit 232 and the recording image data supplied from the image processing section 16 (i.e. the image data representing the R,G,B densities of each of the pixels in the image to be recorded on the photographic paper 224) is stored temporarily in the frame memory 230 via the I/F circuit 232. The frame memory 230 is connected not only to an exposing portion 236 via a D/A converter 234 but also to a printer section control circuit 238.

The exposing portion 236 has three laser light sources 210 that each consist of LD (and SHG as required) in the manner already described above. The exposing portion 236 also has three lines of AOM 214 and AOM driver 216, as well as a main scan unit 240 comprising a polygonal mirror 218 and a motor for rotating it. The exposing portion 236 is connected to the printer section control circuit 238 which controls the operation of its various parts.

In the case of image recording on the photographic paper 224, the image represented by the recording image data need be recorded on the photographic paper 224 by scan exposure. To this end, the printer section control circuit 238 generates scan exposing image data by performing various corrections on the recording image data on the basis of the image recording parameters supplied from the image processing section 16 and stores the generated image data in the frame memory 230. The printer section control circuit 238 then rotates the polygonal mirror 218 in the exposing portion 236 to have laser light emitted from the laser light sources 210R, 210G and 210B; at the same time, the circuit 238 causes the generated scan exposing image data to be outputted from the frame memory 230 into the exposing portion 236 via the D/A converter 234. As the result, the scan exposing image data is supplied to the exposing portion 236 after being converted to an analog signal.

In accordance with the level of the received analog signal, AOM driver 216 varies the amplitude of the ultrasonic signal being supplied to AOM 214; the AOM driver 216 also modulates the intensity of the diffracted laser light from AOM 214 in accordance wish the level of the analog signal (namely, either one of the R, G and B densities of each of the pixels in the image to be recorded on the photographic paper 224). Hence, the three AOMs 214 emit R,G,B laser beams that have been intensity-modulated in accordance with the R,G,B densities of the image to be recorded on the photographic paper 224 and the emitted laser beams are allowed to illuminate the photographic paper 224 after passing through the optics consisting of the polygonal mirror 218, fθ lenses 220 and mirror 222.

As the polygonal mirror 218 rotates, the illuminating positions of the respective laser beams are scanned in the direction of arrow B (see FIG. 7) to accomplish main scan whereas the photographic paper 224 is transported at a given speed in the direction of arrow C (also see FIG. 7) to accomplish auxiliary scan by the laser light, whereupon the desired image is recorded on the photographic paper 224 by scan exposure. The photographic paper bearing the recorded image is fed into the processor section 20.

The printer section control circuit 238 is connected to a printer section driver 242 which, in turn, is connected to a fan 244 for supplying cool air to the exposing portion 236 and a magazine motor 246 for withdrawing the photographic paper from the magazine loaded in the laser printer section. The printer section control circuit 238 is also connected to a back print portion 248 for printing letters and other information on the back side of the photographic paper 224. The actions of the fan 244, magazine motor 246 and back print portion 248 are controlled by the printer section control circuit 238.

The printer section control circuit 238 is also connected to the following components: a magazine sensor 250 that detects the loading or unloading of the magazine containing yet to be exposed photographic paper 224 and its size; an operating panel 252 which is touched by the operator to enter various commands (also see FIG. 2); a densitometer 254 for measuring the density of the image that has been rendered visible by development and other processing steps in the processor section 20; and a processor section control circuit 256 in the processor section 20.

The processor section control circuit 256 is connected to various sensors 258 that detect the passage of the photographic paper 224 as it is transported on its path through the processor section 20, the levels of various processing solutions retained in associated processing tanks, and other relevant phenomena.

The processor section control circuit 256 is also connected to the following components: a sorter 260 with which the sheets of photographic paper ejected out of the processor section after the end of development and other necessary processing steps are sorted in predetermined groups (see FIG. 2); a replenishing system 262 for supplying the processing tanks with replenishers; an auto clean system 264 for cleaning rollers and other members; and various pumps/solenoids 268 that are connected to the processor section control circuit 256 via a processor section driver 266. The actions of the sorter 260, replenishing system 262, auto clean system 264 and various pumps/solenoids 268 are controlled by the processor section control circuit 256.

Operation

Figure 9:
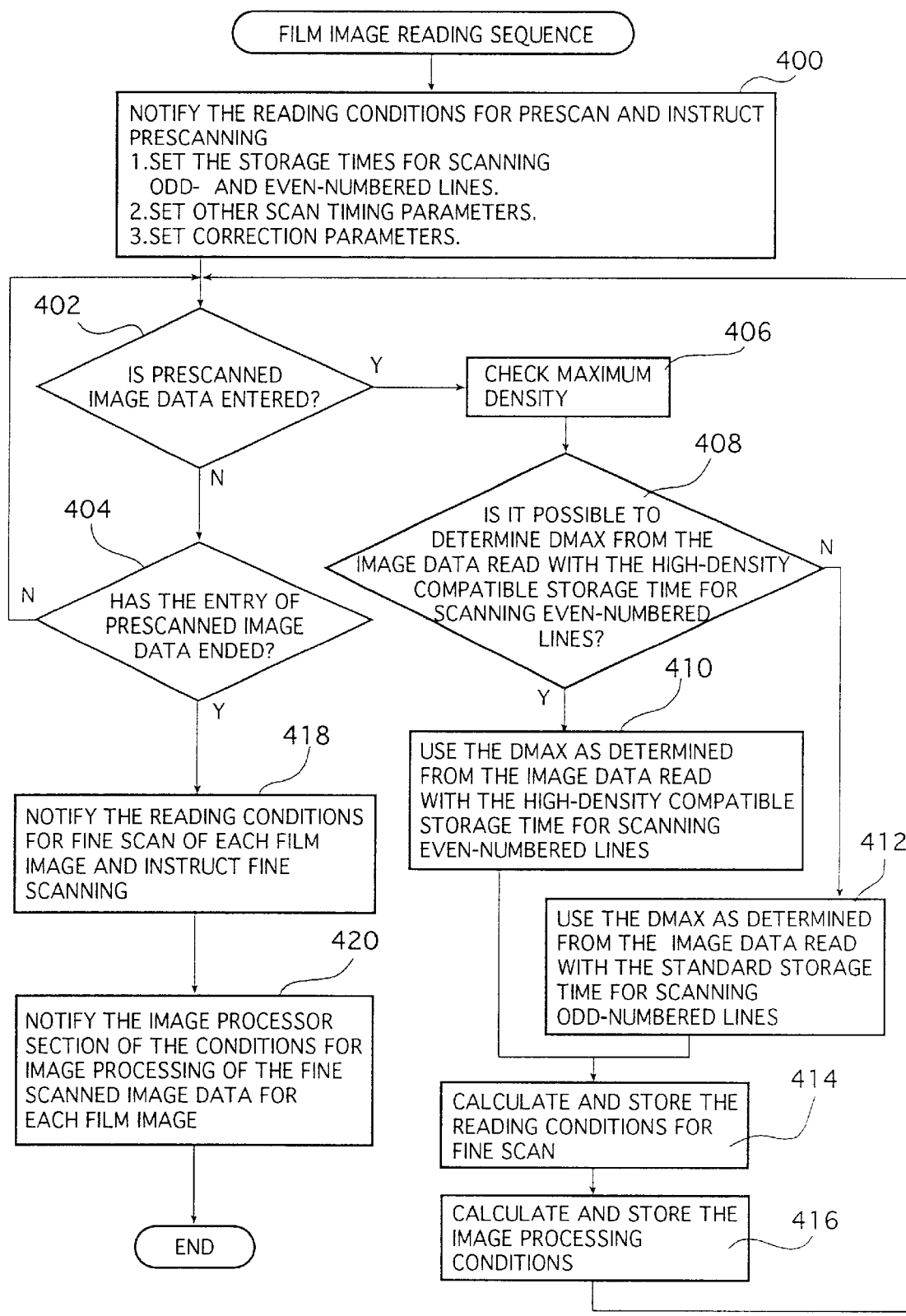
FIG. 9 is a flowchart showing an exemplary sequence of steps in the film image reading in accordance with the image reading apparatus of the invention.

An exemplary operation of the embodiment under consideration is the reading of the film images recorded on the photographic film 22, particularly the reading that is performed with the auto setup engine 144 in the image processing section 16. We now describe this particular embodiment with reference to the flowchart shown in FIG. 9.

In step 400, the line CCD scanner 14 is notified of the reading conditions for prescan to be performed on the film images and, thereafter, the line CCD scanner 14 and the film carrier 38 are given an instruction for prescanning the film images recorded on the photographic film 22. The reading conditions for the prescan include controlling the electronic shutter in the line CCD sensor 116 to vary the its storage time for each color component depending on whether the prescan lines are odd- or even-numbered. For example, the line CCD scanner 14 may be notified of the following two prescan conditions simultaneously, one for scanning odd-numbered lines with the storage time of the line CCD sensor 116 being fixed at the standard storage time and the other for scanning even-numbered lines with the storage time fixed at the high-density compatible storage time. In step 400, the storage times for scanning odd- and even-numbered lines, other scan timing parameters and correction parameters are set.

In response to the instruction for performing prescan, the film carrier 38 transports the photographic film 22 at an appropriate constant speed in a specified direction suitable for the prescan (which is hereinafter conveniently called "forward direction"). In accordance with the notified reading (prescan) conditions, the line CCD 116 in the line CCD scanner 14 reads the film images in the forward direction using the fixed standard storage time for scan in odd-numbered lines and the fixed high-density compatible storage time for scan in even-numbered lines; the resulting image data is outputted to the image processing section 16 as prescanned image data.

In step 402, a check is made to see if the prescanned image data has been entered. If the result is negative, the sequence goes to step 404, where a check is made to see if the prescanned data for all frames of the film image that are recorded in one roll of photographic film have been entered. If the result is still negative, the sequence returns to step 402 and the above-described checks in steps 402 and 404 are repeated.

Upon the entry of the prescanned image data, a positive result is obtained by the check in step 402 and the sequence goes to step 406, where on the basis of the entered prescanned image data, the maximum density (Dmax) and the minimum density (Dmin) of each color component of the film image associated with said prescanned image data are evaluated and, in addition, prescanned image data (including maximum density Dmax and minimum density Dmin) that is optimal for use in setting the conditions for image processing of fine scanned image data, displaying them on the monitor and optionally setting the fine scan conditions is determined in an appropriate, positive and highly precise manner as required by the original image density. Stated more specifically, two separate density histograms are constructed, one from the image data that has been read with the standard storage time for scanning odd-numbered lines by the line CC and the other from the image data read with the high-density compatible storage time for scanning even-numbered lines and, subsequently, the maximum density (Dmax) and the minimum density (Dmin) of each color component for determining the conditions as for correcting the conditions for image processing of the fine scanned image data including both the fine scan conditions and the setup conditions as well as prescanned image data having a sufficiently high precision to match the original image density are determined.

In the next step 408, a check is made to see if the maximum density Dmax of each color component could be obtained from the image that was read with the high-density compatible storage time for scanning even-numbered lines, namely, to see if evaluation of the maximum density Dmax of each color component was impossible due to the saturation at the higher density of the image that was read with the high-density compatible storage time. If the result of the check is positive (none of the color components defied evaluation of the maximum density Dmax), the sequence goes to step 410, where the Dmax of each color component that was obtained from the image data read with the high-density compatible storage time for scanning even-numbered lines is used as a maximum density. If the result 1s negative (any of the color components defied evaluation of the maximum density Dmax), the sequence goes to step 412, where the Dmax of each color component that was obtained from the image data read with the standard storage time for scanning odd-numbered lines is used as a maximum density. If necessary, different values of fixed storage time may be used for different color components. In step 414 and thereafter, setup calculations are performed as described below.

In step 414, characteristic quantities of the film image such as its average density and gray balance are determined on the basis of the entered prescanned image data and, in addition, the color gradation of the image is adjusted by the maximum density (Dmax) and the minimum density (Dmin) that were determined for each color component; on the basis of the determined characteristic quantities and the adjusted color gradation, the reading conditions for performing fine scan on the same film image are calculated and stored in RAM 148 or any other memory in a frame-number related manner.

In the next step 416, the amount of exposure applied when taking the film image, the type of the light source used and any other relevant characteristic quantities are determined on the basis of the entered prescanned image data and on the basis of the thus determined characteristic quantities, the conditions for image processing of the fine scanned image data to be obtained by performing fine scan on the same film image are calculated. In addition, the characteristic quantities determined from successively entered prescanned image data are compared in succession to see if the data represent film images recording similar scenes and the processing conditions are calculated in such a way that the film images recording similar scenes are processed under identical or similar conditions. The calculated processing conditions are then stored in RAM 148 in a frame-number related manner and, thereafter, the sequence returns to step 402.

If the prescanned image data for all film images that are recorded on one roll of photographic film 22 is entered and when the above-described processing is performed on all of the entered prescanned image data, a positive result is obtained by the check in step 404 and the sequence goes to step 418, where the CCD scanner 14 is notified of the reading conditions for performing fine scan on each film image that were previously calculated and stored in RAM 148 and the line CCD scanner 14 and the film carrier 38 are instructed to perform fine scan.

In this case, the film carrier 38 transports the photographic film 22 at an appropriate constant fine scan speed in a direction opposite to the specified direction (which direction is conveniently called "backward direction"). In accordance with the notified reading conditions, the line CCD 116 in the line CCD scanner 14 immediately read the film images in the backward direction and the resulting image data is outputted to the image processing section 16 as fine scanned image data.

In the next step 420, the image processor 140 in the image processor portion 136 is notified of the conditions for image processing of the fine scanned image data for each film image that were previously calculated and stored in RAM 148. As the result, the fine scanned image data for each of the film images that have been supplied from the line CCD scanner 14 into the image processing section 16 is subjected to image processing in the image processor portion 136 in accordance with the processing conditions that were calculated for each film image in the auto setup engine 144 and the thus processed fine scanned image data is outputted to the next stage.

In the above-described embodiment of the present invention, image reading during prescan is performed with the charge storage time of the line CCD being varied depending upon whether the scanning lines are odd- or even-numbered. This provides great flexibility in the acquisition of image data; to acquire image data for the high-density area of the image, the image data as read from even-numbered scan lines is used and for acquisition of image data for the medium- to low-density areas, the image data as read from odd-numbered scan lines is used; alternatively, only the image data as read from odd-numbered scan lines is used if the image has no high-density area; if the image has a high-density area or if it is substantially made up of a high-density area, only the image data as read from even-numbered scan lines is used. Thus, irrespective of the density of a particular frame image, its maximum and minimum densities and the conditions for correcting the fine scan conditions, the conditions for image processing of the fine scanned image data and other conditions can be determined or, alternatively, image data of as high precision as is required by the image density suitable for display on a monitor can be detected in an appropriate manner.

In the foregoing description, image reading is performed with the standard storage time for prescanning odd-numbered lines whereas the high-density compatible storage time is used for scanning even-numbered lines. However, this is not the sole case of the present invention and image reading may be performed with the high-density compatible storage time for scanning odd-numbered lines whereas the standard storage time is used for scanning even-numbered lines. It should also be noted that the timing of changing the storage time of the line CCD need not solely be dependent upon whether the scan lines are odd- or even-numbered. If desired, the number of lines to be scanned with the standard storage time may be adjusted to be greater or smaller than that of lines to be scanned with the high-density compatible storage time and the image read by one method is used for display whereas the image read by the other method is used to determine the points of the maximum density (Dmax) and the minimum density (Dmin), thereby reducing the number of scan lines, shortening the prescan cycle or affording other advantages. In the foregoing description, the storage time of the line CCD is switched between two kinds in one prescan cycle but, if desired, it may be selected from among three or more kinds.

The foregoing description concerns the case where the reading of film images is performed by means of the auto setup engine 144. This is not the sole case of the invention and the following modifications are possible: at least the setup calculations are performed with the auto setup engine 144 and the other processing steps are performed solely with the personal computer 158; or the reading process may be shared between the personal computer 158 and the auto setup engine 144 in various other ways.

In the foregoing description, the reading conditions for fine scan and the conditions for image processing of the fine scanned image data are both calculated on the basis of the image data obtained by prescan. However, this is not the sole case of the invention and it encompasses the case where either the reading conditions or the image processing conditions are calculated on the basis of the prescanned image data.

In the foregoing description, both prescan and fine scan are performed with the same CCD but this is not the sole case of the invention and dedicated CCDs for may separately be provided for prescan and fine scan.

The scanner for reading film images may be of such a type that all film images on various sizes of original photographic film can be read.

As described above, the present invention provides an image reading apparatus that reads original images using an inexpensive line CCD sensor. The apparatus prescans the images to calculate the image reading conditions for fine scan and the conditions as for correcting the image data processing conditions, with the storage time of the line CCD sensor being varied at two or more levels during one prescan of the original images. As a result, irrespective of the density of a particular frame image, a single prescan suffices for detecting maximum and minimum densities as well as high-density and medium- to low-density image data of appropriate precision in an appropriate and positive way. According to the present invention, image information for acquiring not only optimal reading conditions for fine scan that are associated with the density and other characteristics of the original image but also the conditions as for correcting the captured image data processing conditions (image information for performing setup calculations is an example of such information which may be described as prescanned image data having as high precision as is required by the density of the original image) can be obtained by one prescan cycle in a convenient and positive way.

What is claimed is:

1. An image reading apparatus in which an original image undergoing movement relative to said apparatus is read by photoelectric scan with a single line CCD sensor having a single array of CCD elements in a direction perpendicular to said relative movement of said original image, wherein prior to a fine scan of said original image by said single line CCD sensor at a high resolution, said single line CCD sensor performs a single prescan at a low resolution on the scanning lines of said original image by using at least two different storage times, in order to determine the reading conditions for the fine scan at high resolution, and the correcting conditions for correcting the fine scanned image data.

2. The image reading apparatus according to claim 1, wherein a storage time of said single line CCD sensor varies between odd-numbered scanning lines and even-numbered scanning lines.

3. The image reading apparatus according to claim 1, wherein a number of prescan scanning lines using said different storage times is dependent on the particular storage time.

4. The image reading apparatus according to claim 1, wherein said different storage times include at least a standard storage time and a high-density image bearing original compatible storage time.

5. The image reading apparatus according to claim 1, wherein at least one kind of image data read by prescan using said different storage times is displayed on a monitor.

6. The image reading apparatus according to claim 1, wherein at least one kind of image data read by prescan using said different storage times is used for setup calculations.

7. A line CCD sensor used in an image reading apparatus for photo-electrically reading an original image, comprising a single array of CCD elements arranged perpendicular to the relative direction of movement of the original image, wherein the line CCD sensor is a single CCD sensor provided in said image reading apparatus, the line CCD sensor configured to perform a first and second scan of the original image, and wherein the first scan is a single scan that is performed at low resolution on scanning lines of the original image prior to performing the second scan at a higher resolution, the line CCD sensor performing the first scan by using at least two different storage times.

8. The line CCD sensor according to claim 7, wherein said first scan is performed at different storage times to determine the reading conditions for the second scan, as well as for determining any corrections necessary for second scan image data.

9. The line CCD sensor according to claim 7, wherein storage times vary between odd-numbered and even-numbered scanning-lines.

10. The line CCD sensor according to claim 7, wherein a number of scanning lines that are to be scanned in the first scan depend on a particular storage time.

11. The line CCD sensor according to claim 7, wherein image data that was read by the first scan is either displayed or used for setup calculations.

12. The line CCD sensor according to claim 7, wherein the at least two different storage times include a standard storage time and a higher density storage time.

13. A method of reading an original image using a single line CCD sensor, comprising the steps of:

setting initial prescan conditions, which includes setting at least two different storage times for scanning the original image data;

performing the prescan at said different storage times, and thereafter;

performing a fine scan of the original image based on reading conditions and corrections determined from the prescan.

14. The method according to claim 13, wherein prescan is performed at different storage times for scanning even-numbered and odd-numbered scanning lines of the original image.

15. The method according to claim 14, wherein a high density compatible storage time is used for scanning the even-numbered scanning lines, and a standard storage time is used for scanning the odd-numbered scanning lines.

16. The method according to claim 15, wherein the storage time used for scanning either even-numbered or odd-numbered scanning lines is a function of the maximum image density of said read original image data.

17. An image reading apparatus in which an original image undergoing movement relative to said apparatus is read by photoelectric scan with a single line CCD sensor having a single array of CCD elements in a direction perpendicular to said relative movement of said original image, wherein, prior to a fine scan of said original image by said single line CCD sensor at a high resolution, said single line CCD sensor performing a single prescan at a low resolution on a scanning line of said original image by using at least two different storage times, said single line CCD sensor including a unit for determining said reading condition for the fine scan at a high resolution under said correcting condition for correcting the fine scanned image data.

18. The image reading apparatus according to claim 17, wherein a storage time of said single line CCD sensor varies between odd-numbered scanning lines and even numbered scanning lines.

19. The image reading apparatus according to claim 18, wherein a number of prescan scanning lines using said different storage times is dependent on a particular storage time.

20. The image reading apparatus according to claim 17, wherein said different storage times include at least a standard storage time and a high-density image bearing original compatible storage time.

21. The image reading apparatus according to claim 17, wherein at least one kind of image data read by prescan using said different storage times is displayed on a monitor.

22. The image reading apparatus according to claim 17, wherein at least one kind of image data read by prescan using said different storage times is used for setup calculations.

* * * * *